United States Patent
Neugeboren

(10) Patent No.: US 12,413,439 B2
(45) Date of Patent: Sep. 9, 2025

(54) SYSTEMS AND METHODS FOR R-MACPHY PARTIAL SERVICE SUPPORT

(71) Applicant: ARRIS Enterprises LLC, Suwanee, GA (US)

(72) Inventor: Yair Neugeboren, Netanya (IL)

(73) Assignee: ARRIS Enterprises LLC, Suwanee, GA (US)

( * ) Notice: Subject to any disclaimer, the term of this patent is extended or adjusted under 35 U.S.C. 154(b) by 415 days.

(21) Appl. No.: 18/104,187

(22) Filed: Jan. 31, 2023

(65) Prior Publication Data

US 2023/0291597 A1 Sep. 14, 2023

Related U.S. Application Data

(60) Provisional application No. 63/305,154, filed on Jan. 31, 2022.

(51) Int. Cl.
| | |
|---|---|
| H04L 12/28 | (2006.01) |
| H04J 3/06 | (2006.01) |
| H04J 3/14 | (2006.01) |
| H04L 12/12 | (2006.01) |
| H04N 21/61 | (2011.01) |

(52) U.S. Cl.
CPC .......... H04L 12/2801 (2013.01); H04L 12/12 (2013.01); H04L 12/2885 (2013.01); H04N 21/6118 (2013.01); *H04J 3/0644* (2013.01); *H04J 3/0667* (2013.01); *H04J 3/14* (2013.01)

(58) Field of Classification Search
CPC . H04L 12/2801; H04L 12/12; H04L 12/2885; H04N 21/6118; H04J 3/0644; H04J 3/0667; H04J 3/14
See application file for complete search history.

(56) References Cited

U.S. PATENT DOCUMENTS

| | | | |
|---|---|---|---|
| 12,132,949 B1 * | 10/2024 | Rubin | ................... H04N 21/242 |
| 2015/0295669 A1 | 10/2015 | Chapman et al. | |

FOREIGN PATENT DOCUMENTS

WO 2020124005 A2 6/2020

OTHER PUBLICATIONS

Alharbi et al., Performance Comparison of R-PHY and R MACPHY Modular Cable Access Network Architectures, IEEE Transactions on Broadcasting, vol. 64, No. 1, Mar. 2018 (Year: 2018).*
Microsemi: "White Paper Best Engineering Practicing for Cable Timing Architecture—A Study of DOCSIS 3.1", Sep. 25, 2017, XP093037915, Retrieved from the Internet: URL:https://www.microsemi.com/document-portal/doc_view/137526-best-engineering-practices-for-cable-timing-architecture-a-study-of-docsis-3-1 [retrieved on Apr. 6, 2023] p. 2, paragraph 1—p. 10, paragraph 2.
International Search Report and Written Opinion RE: Application No. PCT/US2023/12045, dated Apr. 20, 2023.

* cited by examiner

*Primary Examiner* — Brian J. Gillis
*Assistant Examiner* — Chhian (Amy) Ling
(74) *Attorney, Agent, or Firm* — Chernoff, Vilhauer, McClung & Stenzel, LLP

(57) ABSTRACT

Systems and methods for providing DOCSIS services and at least one additional services to a cable modem by a Remote MACPHY device (RMD). The additional service is provided using a core configured to have an associated timing lock to the RMD, where the RMD is configured to receive information indicating the absence of the timing lock and use the information to disable the additional service while selectively maintaining the DOCSIS services.

20 Claims, 3 Drawing Sheets

SYSTEMS AND METHODS FOR R-MACPHY PARTIAL SERVICE SUPPORT

CROSS REFERENCE TO RELATED APPLICATIONS

The present application claims priority to U.S. Provisional Application No. 63/305,154 filed Jan. 31, 2022, the content of which is incorporated herein by reference in its entirety.

BACKGROUND

The subject matter of this application generally relates to distributed access architectures of a hybrid CATV network, and more particularly to R-MACPHY (remote MACPHY) architectures that distribute the functions of the Cable Modem Termination System into the network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content terminates as RF signals over coaxial cables, but is transmitted over the bulk of the distance between the content provider and the subscriber using optical signals. Specifically, CATV networks include a head end at the content provider for receiving signals representing many channels of content, multiplexing them, and distributing them along a fiber-optic network to one or more nodes, each proximate a group of subscribers. The node then de-multiplexes the received optical signal and converts it to an RF signal so that it can be received by viewers. The system in a head end that provides the video channels to a subscriber typically comprises a plurality of EdgeQAM units operating on different frequency bands that are combined and multiplexed before being output onto the HFC network.

Historically, the head end also included a separate Cable Modem Termination System (CMTS), which is used to provide high speed data services, such as video, cable Internet, Voice over Internet Protocol, etc. to cable subscribers. Typically, a CMTS will include have both Ethernet interfaces (or other more traditional high-speed data interfaces) as well as RF interfaces so that traffic that is coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the video delivery system (EdgeQAM) in a single platform called the Converged Cable Access Platform (CCAP).

As networks have expanded and head ends have therefore become increasingly congested with equipment, many content providers have recently used distributed architectures to spread the functionality of the CMTS/CCAP throughout the network. This distributed architecture keeps the cable data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is a Remote PHY (R-PHY) distributed access architecture that relocates the physical layer (PHY) of a traditional CMTS or CCAP by pushing it to the network's fiber nodes. Thus, while the core in the CMTS/CCAP performs the higher layer processing, the R-PHY device in the node converts the downstream data sent by the core from digital to analog to be transmitted on radio frequency, and converts the upstream RF data sent by cable modems from analog to digital format to be transmitted optically to the core.

Another such distributed architecture is a Remote MAC-PHY (R-MACPHY) architecture that relocates not only the physical layer processing devices into the network fiber nodes, but also the Media Access Control (MAC) layer into the fiber nodes. The MAC layer determines which computer on the network is allowed to use the media at any given moment by receiving framed data from the Logical Link Control layer immediately above it and reframes the data, adding a source and destination physical address or MAC address to the frame for transmission on the medium.

Once functionality traditionally occurring in the head end is distributed to remote devices throughout the network, however, protocols must be established to properly synchronize the core with these distributed devices. Such synchronization must also occur between the distributed (remote) devices and other cores in the network. For example, a CCAP core in a head end may be used to provide Data over Cable Services Interface Specification (DOCSIS) data between the head end and a cable modem, while a video core provides video data to a cable modem, or an out-of-bandwidth (OOB) core exchanges OOB data with a cable modem. Synchronization between any of these cores and the remote devices must occur upon initialization of the devices, and sometimes this synchronization cannot occur due to a lack of a lock to a timing device. Also, synchronization becomes particularly problematic when the either the core or the remote device later loses connection to the timing clock used for synchronization (a period referred to as "holdover"). Even though each device will usually include its own oscillator to mark time, the oscillators of each device will nonetheless drift relative to each other once synchronization is lost, and upon reconnection the drift may have become so severe as to impede performance.

The typical approach to redress timing issues that occur when a timing lock cannot be found upon initialization, or following a period of holdover when either the core or the remote device has lost connection to the synchronization clock is to either use better oscillators in the devices or use frequency assistance from the network to avoid frequency drift. These solutions, however, are costly in both power and price. Moreover, many networks do not even support frequency assistance.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
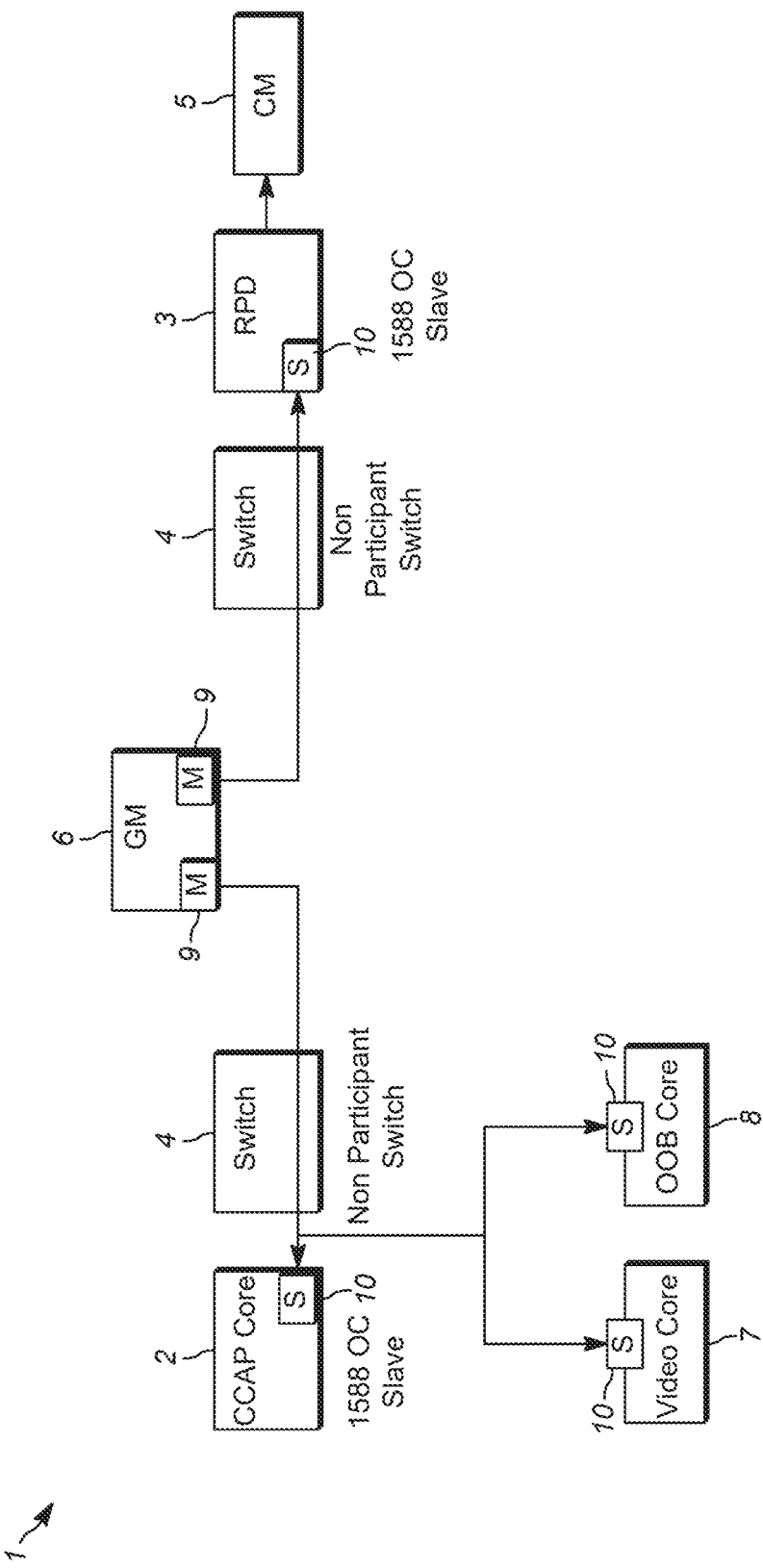
FIG. 1 shows an exemplary timing arrangement for an R-PHY system where an RPD attains a timing lock with a CCAP core, a video core, and an OOB core via a common grandmaster clock.

As already noted, in R-PHY and R-MACPHY systems, the clocks of the remote devices and the respective cores that provide them data may be required to synchronized for time scheduling of data transfers to work properly. Referring to FIG. 1, for example, an exemplary R-PHY architecture 1 may include a CCAP core 2, a video core 7, and an OOB core 8, each synchronized with an RPD 3 and all connected together via a plurality of network switches 4. The RPD 3 is in turn connected to one or more cable modems 5. Synchronization is attained by a grandmaster clock 6 which includes a plurality of master clock ports 9 that send timing information to respective slave clocks 7 in the RPD 3 as well as the CCAP core 2, the video core 7 and the OOB core 8. Those of ordinary skill in the art will appreciate that, although FIG. 1 shows only one RPD 3 connected to the core 2, many such RPDs may be simultaneously connected to the cores 2, 7, and 8 with each RPD having a slave clock 7 receiving timing information from the grandmaster clock 6. Those of ordinary skill in the art will also appreciate that the architecture 1 may include more cores than the cores 2, 7, and 8 shown e.g., Narrowband Digital Forwarding/Return (NDF/NDR) and leakage detection services are provided via respective cores.

Many of these services such as video, OOB (Out of Band), NDF/NDR and Leakage detection require the RPD 3 and the respective core that provides services to be synchronized in frequency only. The requirement for frequency accuracy between the RPD 3 and the various cores 2, 7, and 8 varies between the different services e.g., leakage detection requires 500 ppb of accuracy while video services require about 50 ppm. However, in Remote PHY architectures the RPD 3 and the CCAP Core 2 must be synchronized not only in frequency, but also in phase in order for DOCSIS time scheduling to work properly. For example, the Remote DTI (R-DTI) specification requires that the RPD 3 and the CCAP core 2 be phase aligned with less than a 1 ms between the two.

The IEEE-1588 protocol is used to perform both frequency and phase synchronization in an R-PHY system. Once the RPD 3 achieves phase and frequency lock to its external timing master, it can provide all the required services. While both the core 2 and the RPD 3 are locked with the timing grandmaster 6, no significant problems occur, but problems will occur when either the RPD 3 or the core 2 cannot acquire connection, or lose connection, to the timing grandmaster 6. In that period where one or both devices have no connection to the timing clock of the grandmaster 6, the unconnected devices will drift in frequency and phase from the timing grandmaster 6 and from the other device. The magnitude of that drift will depend on many factors, including the length of the holdover period, temperature variations, internal oscillator performance etc. For example, an RPD 3 with a typical TCXO oscillator might drift 1 ms in phase even within one hour. Typically, an RPD's drift is worse than the core's drift as the core usually has a better oscillator and is in a temperature-controlled environment.

When connection to the timing grandmaster 6 is subsequently attained, the RPD 3 (or core 2 if the core had lost connection) would measure its phase offset from the grandmaster 6 12 and would need to adopt one of two methods to correct the offset and re-establish synchronization in both phase and frequency. Ideally, because any phase step adjustment would cause connected cable modems to go offline, the RPD 3 or core 2 would only change its frequency relative to that of the grandmaster 6 to compensate for the phase offset, until such time as the phases are within tolerances, after which the frequency would be set to that of the grandmaster 6. However, to maintain DOCSIS compliance, frequency adjustments must be less than a specified threshold, so compensating for phase drift by frequency adjustments may often take a long time to achieve a desired phase adjustment, thus in many cases a phase step adjustment may simply be adopted which causes cable modems to go offline.

Figure 2:
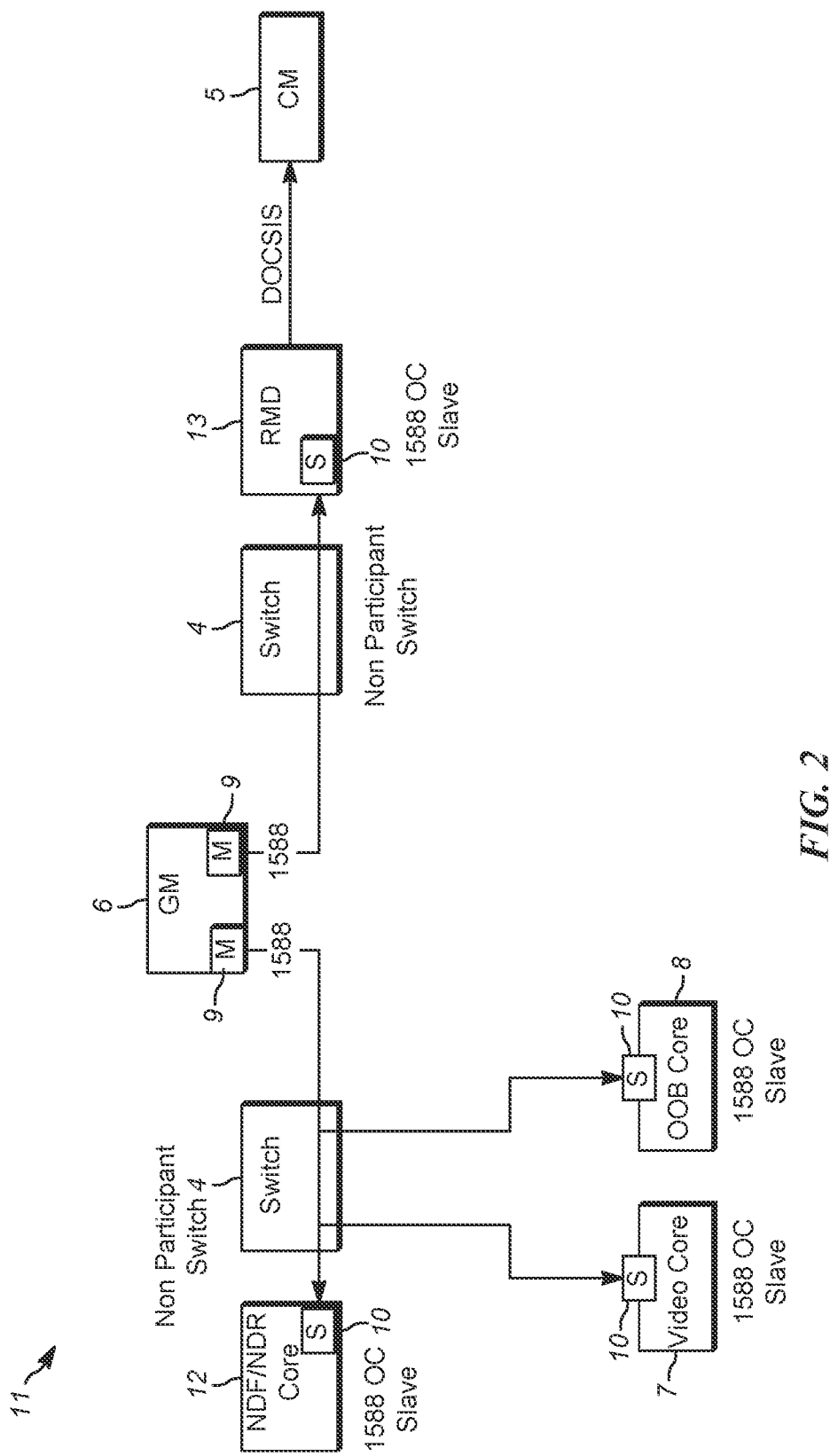
FIG. 2 shows an exemplary timing arrangement for an R-MACPHY system where an RMD attains a timing lock with an NDF/NDR core, a video core, and an OOB core via a common grandmaster clock.

FIG. 2 shows an alternate R-MACPHY architecture 11 which also uses a grandmaster timer 6 to provide synchronization, via master ports 9 and respective slave ports 10, between an RMD 13 for example, and respective cores 7, 8, and 12 through switches 4. Since, in R-MACPHY architectures the MAC and PHY layers coexist (similar to the traditional CMTS architectures), the RMD 13 is not required to be synced to an external time for DOCSIS services, however, for other services such as video, OOB, NDF/NDR, and leakage detection, the RMD 13 is still required to be synchronized in frequency to these respective cores.

Since the RMD requires external timing support for part of its services, the common practice is to rely on the external timing lock to grandmaster 6 to enable DOCSIS services to start, as well. This is because once DOCSIS services are enabled even small changes in frequency and phase needed to lock to an external timing server might be disruptive to DOCSIS service. The main disadvantage of this approach is that if an external timing source is not available, because of holdover for example, none of the services will become operational until the RMD 13 gains or regains a timing lock to an external timing source.

Proposed in this disclosure are systems and methods that allow the RMD 13 to operate in partial service mode. If an external timing source is not available, the RMD 13 will immediately enable (or sustain, in case of holdover) those services that do not require external timing lock (e.g., DOCSIS). When an external timing source such as grandmaster 6 becomes available, the RMD 13 may gradually change its local clock to lock to the external clock source while preferably limiting as much as possible the disruption to already-enabled services. In preferred embodiments, when the timing grandmaster 6 becomes available, the RMD 13 calculates its current frequency and phase offset from the grandmaster 6. It then preferably intelligently or otherwise automatically decides what is the best convergence method to lock to the external timing source, balancing the goals of minimizing disruption and time of convergence. In some preferred embodiments, the RMD 13 intelligently makes this determination based on user preferences specifying a threshold time that would allow different services to remain or become available as opposed to being disrupted. In some embodiments, the foregoing method could be examined independently for each service and its mission criticality.

As an example of the foregoing procedure, assume that there are three services that need to be provided by the RMD 13—DOCSIS, video, and leakage detection. DOCSIS service do not require external timing lock while video requires frequency accuracy of ~50 ppm and leakage detection requires frequency accuracy of 500 ppb. If external timing is not available, the RMD can enable immediately the DOCSIS service, while waiting for the timing source for the other 2 services to be enabled. Once the timing source such as grandmaster clock 6 becomes available, the RMD 13 can calculate the frequency offset to the grandmaster clock 13.

Assume the calculation returns 10 ppm offset (typical stratum 3 accuracy between 2 clocks). In order not to disrupt DOCSIS services, the clock 10 of RMD 13 cannot be changed faster the 10 ppb/s. Thus, in order to converge to 500 ppb, from 10 ppm it will take at least 1500 sec (25 minutes). A fast convergence that would disrupt DOCSIS could alternatively only take few minutes.

The RMD 13 can decide intelligently based on user preferences, what is the threshold in time that it would allow different services to become available or be disrupted. In the above case, a user can decide that a leakage detection service less mission critical by assigning to it a relatively large threshold time that would allow slow convergence to occur without affecting DOCSIS services, while Video services are assigned a relatively low threshold time reflecting greater mission criticality, and should converge faster even if it disrupts DOCSIS services for few minutes. If either threshold is exceeded based on the calculation described in the preceding paragraph, the RMD 13 can intelligently decide to synchronize the clock 10 of the RPD 13 to the clock 9 of the grandmaster timer 6 abruptly with a phase shift, thereby electing the fast convergence at the expense of an interruption of DOCSIS services.

Figure 3:
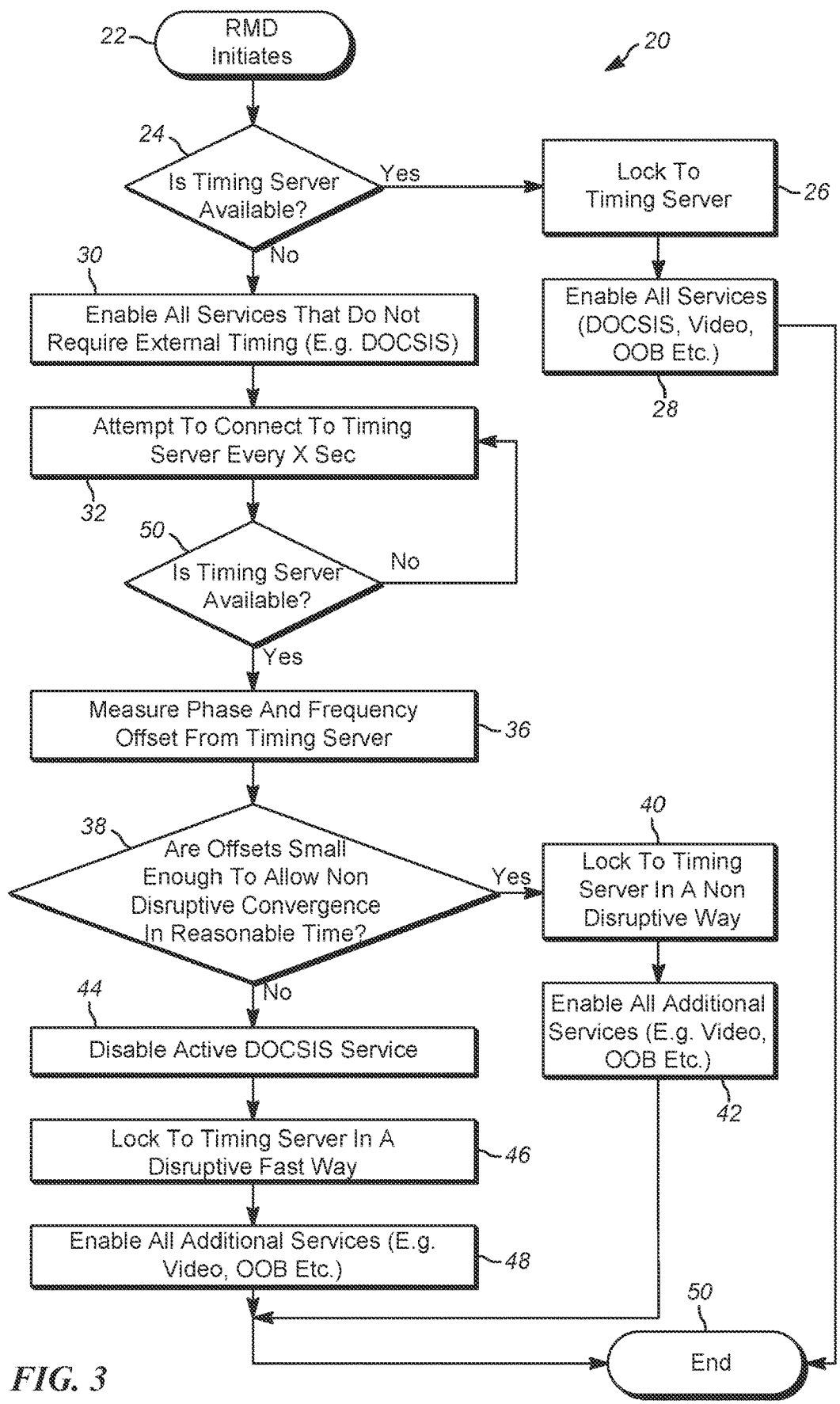
FIG. 3 shows a method used by the system of FIG. 2 that improves the performance of the system due to drift during holdover.

FIG. 3 shows a preferred method 20 used by the RMD 13 of FIG. 2 according to an embodiment of the present disclosure. At step 22 the RMD 22 initiates the method 20, and at step 24 determines whether a timing server, such as a grandmaster clock 6 is (or remains) available. If the answer is yes, then at step 26 the method locks to the timing server (grandmaster clock 6) and at step 28 enables all services that require a timing lock with the RMD 13, e.g., DOCSIS, video, OOB etc. The routine then ends at step 50, or in some preferred embodiments returns to step 24 to determine whether the timing lock continues, or alternatively is lost with a period of holdover ensuing. If, at step 24 it is determined that a timing grandmaster is (or is no longer) available, the procedure proceeds to step 30 where all services are enables that do not require a timing lock, e.g., DOCSIS services. At step 32 the procedure attempts to periodically connect (or reconnect) to a timing server such as grandmaster clock 6. The period of such connection/reconnection attempts may in some embodiments be configurable. At step 34 the procedure determines whether a timing server becomes available. If not, the procedure reverts to step 32 to await the next sequential interval, but if a timing server does become available, then at step 36 the phase and frequency offsets of the RPD 13 relative to the timing server (e.g., grandmaster clock 6) are measured. At step 38 it is determined whether the offsets are small enough to allow convergence within a specified one or more time intervals, e.g. whether all the services have respective threshold times set by a user that are greater than the specified one or more time intervals. If the answer is "yes," the method proceeds to step 40 where the RPD 13 locks to the timing server in a non-disruptive way, e.g. phase synchronization is regained gradually over time with a small, tolerable difference in frequency between the timing server and the RPD 13, and at step 42 all services are enabled, and the procedure then ends (or alternatively reverts to step 24 as indicated above).

If at step 38, if the answer is "no" then at step 44 DOCSIS services are disabled and at step 46 the timing server is locked in a disruptive way, e.g., with a phase step adjustment. After the phase step adjustment, at step 48 all services are enables, and the procedure again either ends, or alternatively reverts to step 24 as indicated above.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A Remote MACPHY device (RMD) providing:

Data Over Cable Services Interface Specification (DOCSIS) services and an additional service to a cable modem, the additional service provided using a core configured to have an associated timing lock to the RMD;

the RMD configured to receive information indicating the absence of the timing lock and use the information to disable the additional service while selectively maintaining the DOCSIS services.

2. The RMD of claim 1 where the additional service is at least one of a video service, an out-of-bandwidth (OOB) service and a Narrowband Digital Forwarding/Return (NDF/NDR) service.

3. The RMD of claim 1 where the RMD is configured to selectively enable the additional service when the information indicates that the timing lock is subsequently established.

4. The RMD of claim 3 where the RMD selectively enables the additional service after implementing an automatically selected one of: (i) maintaining the DOCSIS services or (ii) disrupting the DOCSIS services.

5. The RMD of claim 4 where automatic selection is based on a measurement of a length of time required for resynchronization of phase of the RMD relative to the timing server.

6. The RMD of claim 5 where the automatic selection is based on a comparison of the measurement to a threshold.

7. The RMD of claim 6 where the threshold is set by a user.

8. The RMD of claim 6 providing a plurality of additional services, each additional service provided by a respectively associated core, and automatic selection is based on a comparison of the measurement to each of a plurality of thresholds, each threshold associated with a respective one of the plurality of additional services.

9. The RMD of claim 8 where DOCSIS service is disabled if the measurement exceeds any one of the plurality of thresholds.

10. The RMD of claim 4 where the measurement is based on both a phase offset and a frequency offset.

11. A method implemented by a Remote MACPHY device (RMD), comprising:

providing Data Over Cable Services Interface Specification (DOCSIS) services and an additional service to a cable modem, the other service provided using a core configured to have an associated timing lock to the RMD receiving information indicating the absence of the timing lock; and using the information to disable the additional service while selectively maintaining the DOCSIS services.

12. The method of claim 11 where the additional service is at least one of a video service, an out-of-bandwidth (OOB) service and a Narrowband Digital Forwarding/Return (NDF/NDR) service.

13. The method of claim 11 where the RMD selectively enables the additional service when the information indicates that the timing lock is subsequently established.

14. The method of claim 13 where the RMD selectively enables the additional service after implementing an automatically selected one of: (i) maintaining the DOCSIS services or (ii) disrupting the DOCSIS services.

15. The method of claim 14 where automatic selection is based on a measurement of a length of time required for resynchronization of phase of the RMD relative to the timing server.

16. The method of claim 15 where the automatic selection is based on a comparison of the measurement to a threshold.

17. The method of claim 16 where the threshold is user adjustable.

18. The method of claim 16 providing a plurality of additional services, each additional service provided by a respectively associated core, and automatic selection is based on a comparison of the measurement to each of a plurality of thresholds, each threshold associated with a respective one of the plurality of additional services.

19. The method of claim 18 where DOCSIS service is disabled if the measurement exceeds any one of the plurality of thresholds.

20. The method of claim 14 where the measurement is based on both a phase offset and a frequency offset.

* * * * *